United States Patent [19]
Halovitz

[11] Patent Number: 5,288,017
[45] Date of Patent: Feb. 22, 1994

[54] COLLAPSIBLE SPREADER

[75] Inventor: Paul M. Halovitz, Escondido, Calif.

[73] Assignee: Republic Tool & Mfg. Corp., Carlsbad, Calif.

[21] Appl. No.: 985,582

[22] Filed: Dec. 8, 1992

[51] Int. Cl.⁵ ............................................. A01C 17/00
[52] U.S. Cl. ................................. 239/687; 239/600; 222/625
[58] Field of Search ....................... 56/DIG. 18, 16.7; 239/681, 683, 687, 685, 600; 222/613, 610, 609, 625

[56] References Cited

U.S. PATENT DOCUMENTS

| | | | |
|---|---|---|---|
| 3,523,648 | 8/1970 | Garber | 239/687 X |
| 4,121,733 | 10/1978 | McRoskey et al. | 222/625 X |
| 4,469,210 | 9/1984 | Blumer et al. | 193/22 |
| 4,671,434 | 6/1987 | Jonnston et al. | 222/625 |
| 4,681,265 | 7/1987 | Brabb et al. | 239/687 X |
| 4,784,405 | 11/1988 | Stein | 280/655 |
| 5,159,803 | 11/1992 | Earley | 56/167 |
| 5,163,275 | 11/1992 | Hare et al. | 56/16.7 |

FOREIGN PATENT DOCUMENTS 779767 7/1957 United Kingdom ................ 239/687

Primary Examiner—Andres Kashnikow
Assistant Examiner—Kevin P. Weldon
Attorney, Agent, or Firm—Harry Williams

[57] ABSTRACT

A collapsible spreader having all parts pre-assembled that requires no tools for its transformation into an operative device and that includes a wheel assembly, a two-part frame member, whose lower part is affixed to the wheel assembly and supports a high-volume hopper as well as a collapsible support stand. The leg members of the lower frame are pivotally connected to the legs of the upper frame, such that the lower and upper frames when pivoted into an extended position from a trapezoidal loop and, when returned to their collapsed state, form a generally rectangular prism that includes the entire spreader device within its volume, namely the legs of the lower and upper frames, the hopper, the support stand, the seed-dispensing mechanism and the wheel assembly.

19 Claims, 4 Drawing Sheets

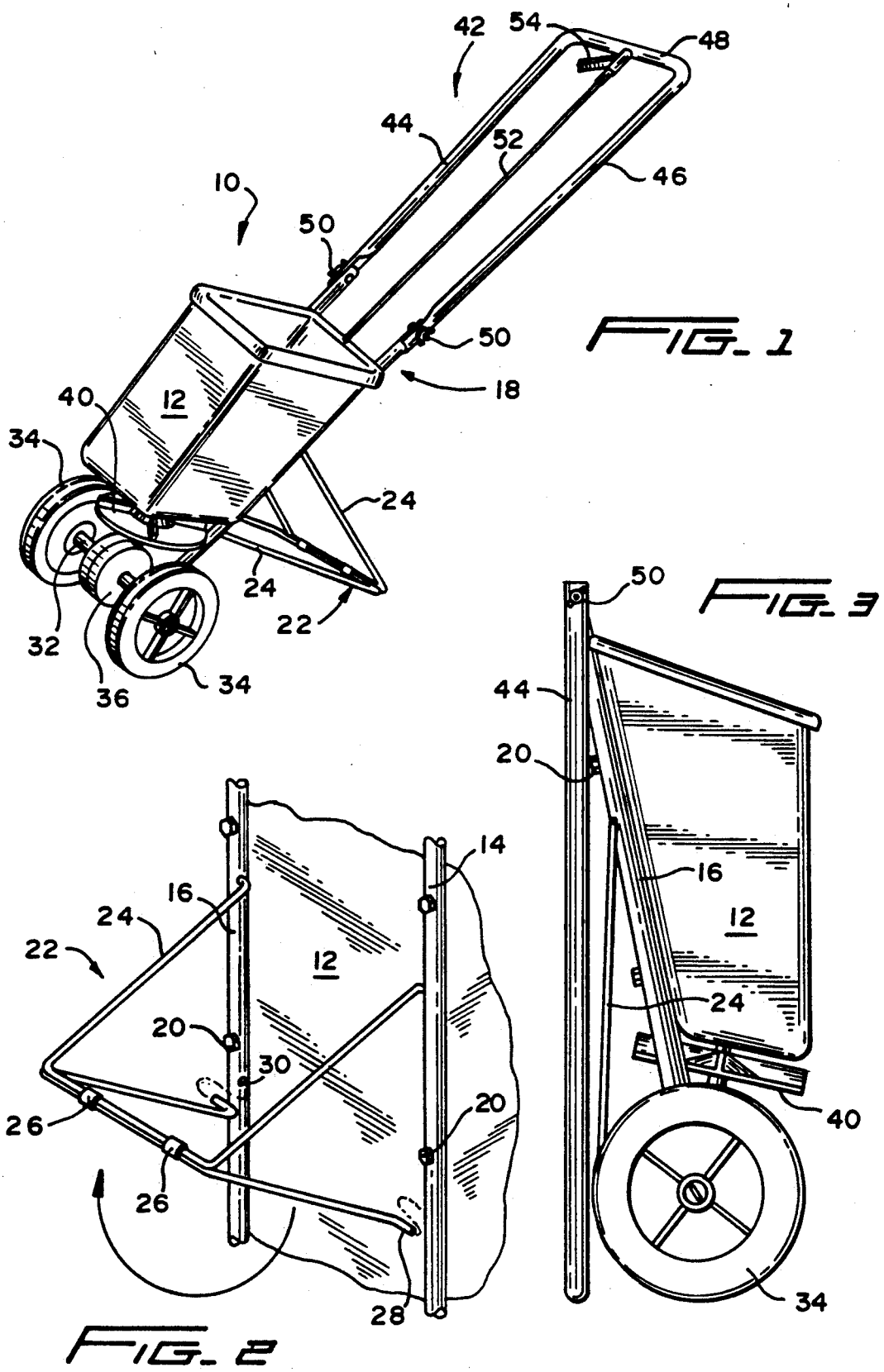

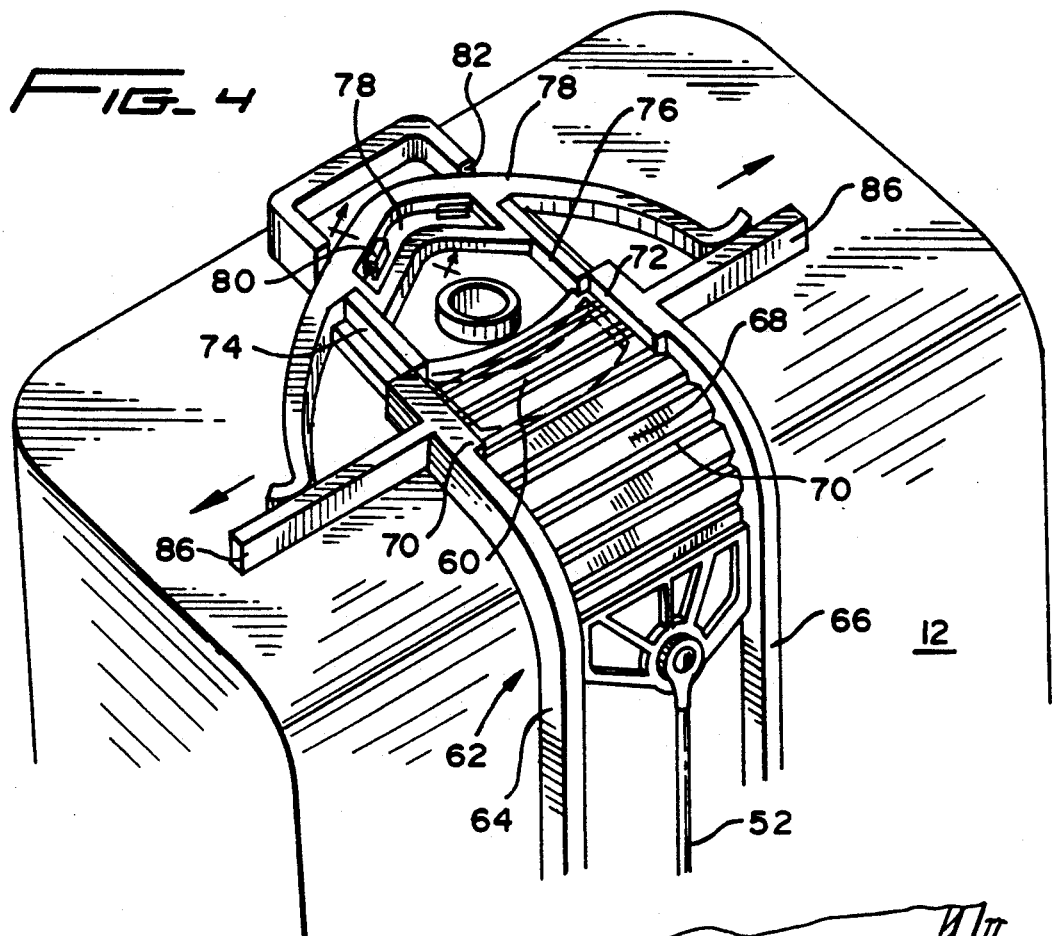
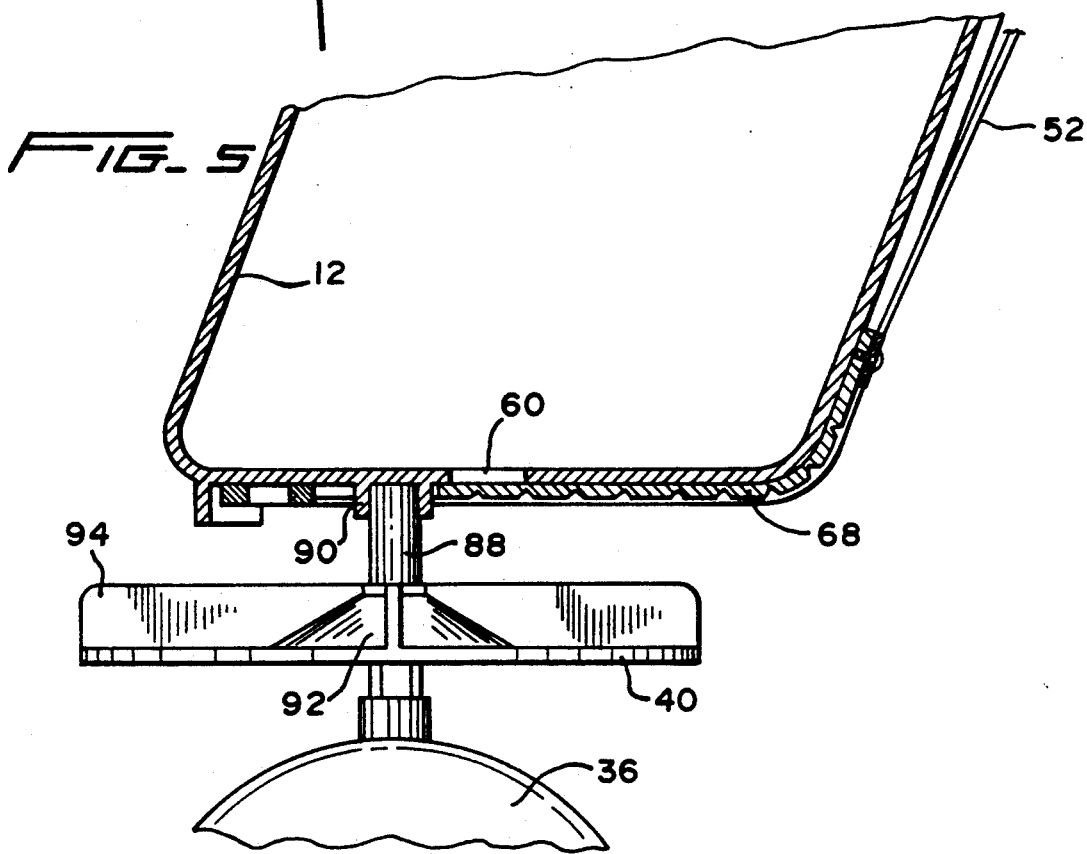

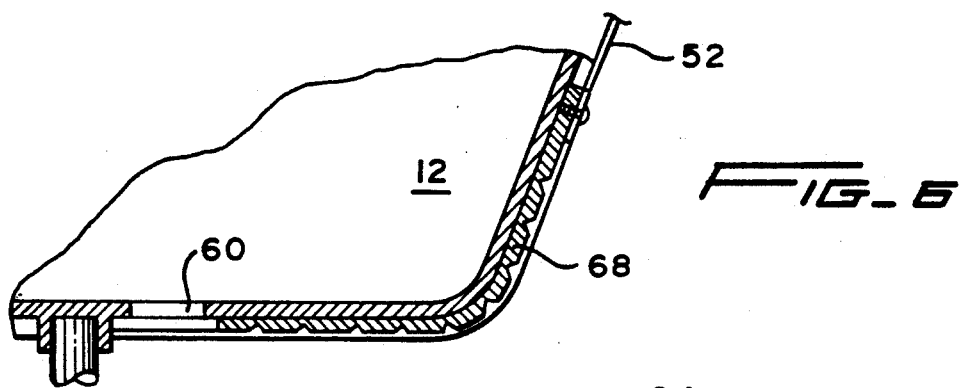
FIG_6
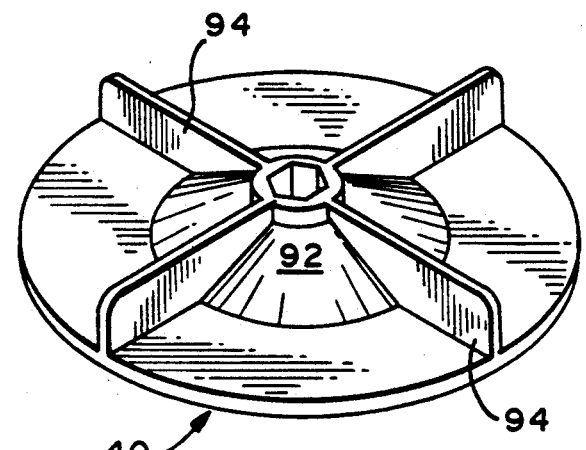
FIG_7
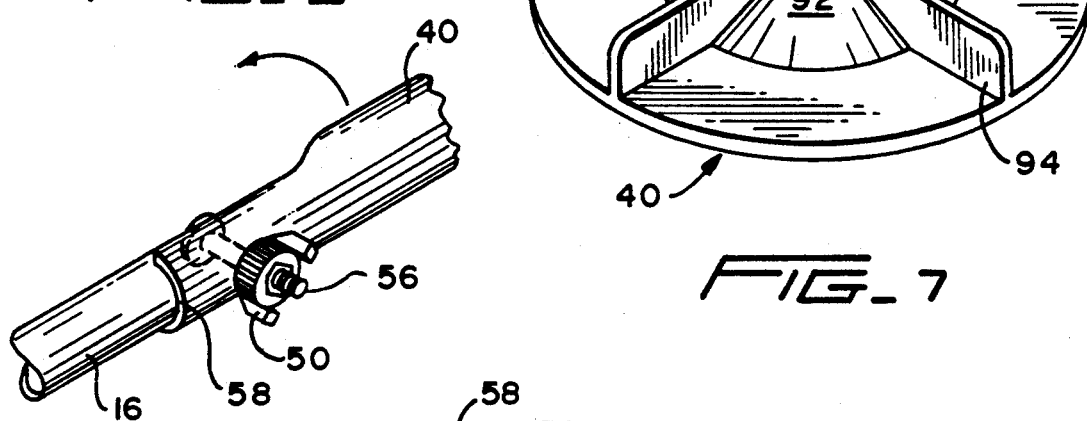
FIG_8
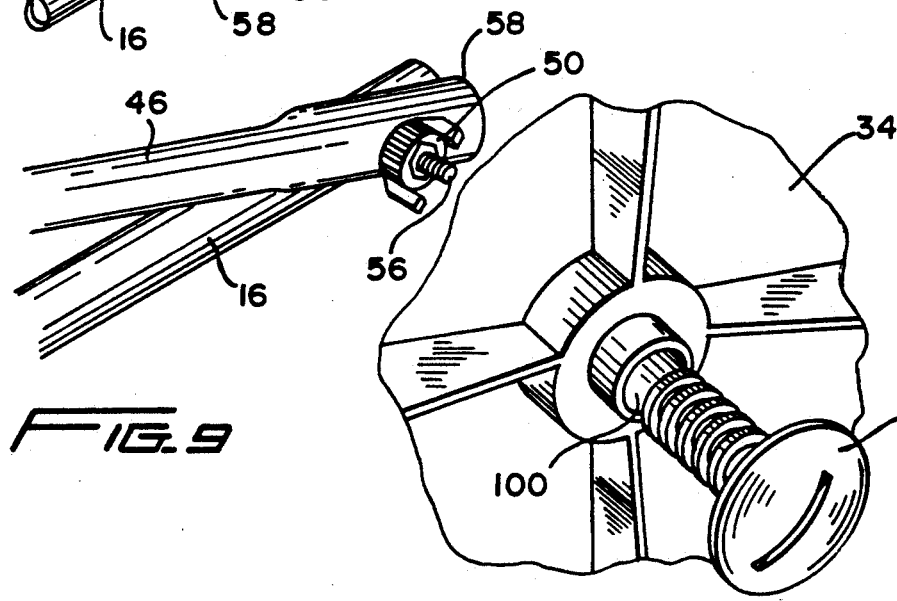
FIG_9
FIG_10

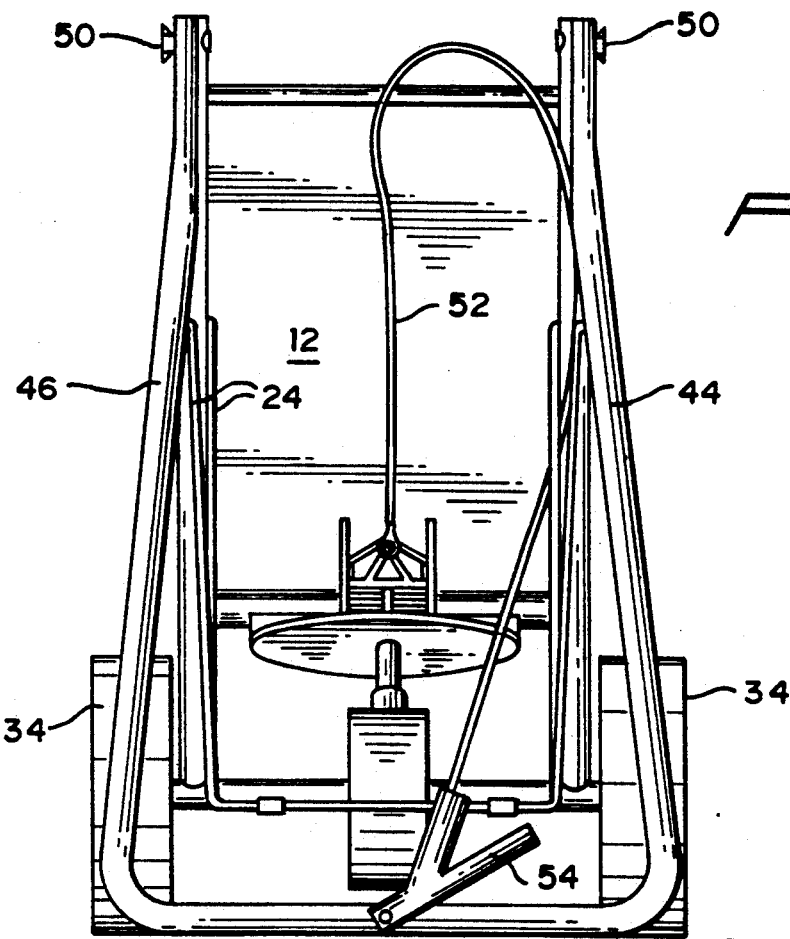
FIG_12
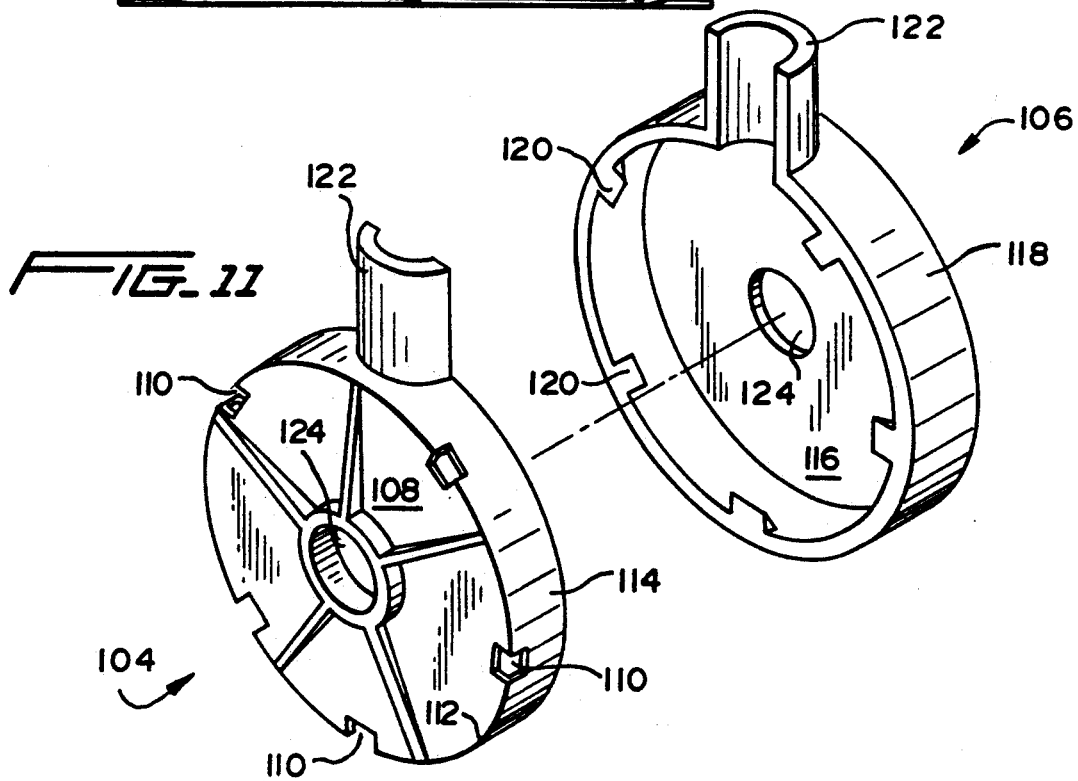
FIG_11

COLLAPSIBLE SPREADER

BACKGROUND OF THE INVENTION

The present invention generally relates to portable spreaders of both the broadcast and drop kind which are supportable on a pair of wheels and which can be manually pushed by an operator and whose dispensing rate, including on-off control, can be manually regulated.

Spreaders of this kind can be of two types, a unit which is permanently constructed at the factory, and an articulated unit designed for assembly by the consumer after purchase. In the latter case, the consumer is normally required to fit various parts of the structure or product together, usually with the aid of some basic tools in order to assemble the product into its final or finished form for use. After the product is assembled it is not intended for disassembly into its various parts, because some of those parts are "irreversibly" put together, that is, they are secured by nuts and bolts or one-way friction-fit devices that are not designed to be undone. In still other cases where some part of the product is designed for disassembly or collapsibility (such as a handle), there still remain other parts of the product—wheels, support stands, hoppers, gearing mechanisms and housings etc.—which after assembly by the consumer are intended to remain in place. Naturally, such products pose a problem if they are intended to be stored or transported after use, particularly if it is desired to place or store the product within the confines of a small space with other equipment, such as a closet, or in the back of a truck, or in the trunk of a car.

There is needed, therefore, to provide a product, such as a portable spreader, which can be purchased in a completely pre-assembled but collapsed state and which can be converted for use in a matter of seconds without the aid of any tools, and which can be put back into its collapsed state in the same amount of time.

OBJECTS AND SUMMARY OF THE INVENTION

It is a primary purpose and principle feature of the present invention to address the aforementioned need and provide a full-featured portable wheeled spreader, including on-off and dispensing rate control, which can be converted from a collapsed state of its pre-assembled parts into an operative device in a matter of seconds without the aid of or the need for any tools whatsoever.

It is another feature of the present invention to provide a portable spreader constructed entirely from pre-assembled parts which can be converted from a collapsed state into a full-featured wheeled spreader in a matter of seconds without the aid of tools of any kind.

It is still another feature of the present invention to provide a full-featured portable spreader which can be collapsible into the shape of a generally rectangular prism and which, after use, can be stored in the box in which it was purchased or any box having a similar rectangular shape.

It is still yet another feature of the invention to provide a spreader that uses wheels which can be removed and replaced at any time.

Still another feature of the invention is the use of a simplified clamshell gear-box housing structure which snaps together, is free of hardware ad uses no separate parts for retention of the two clamshell halves.

It is yet another feature of the invention to provide a flexible shut-off plate at the bottom of the hopper of the spreader which uses a simple plastic bow-spring mechanism for efficient on-off control and dispensing-rate control.

It is yet another feature of the invention to provide a collapsible wheeled spreader that uses a collapsible two-part support frame that snaps both into and out of place when either collapsed or expanded.

It is still another feature of the invention to provide a collapsible wheeled spreader that can be collapsed without the aid of tools into a generally rectangular prism shape that fits into a box in which the spreader was purchased and which can include, as well, a high-volume hopper (over four gallons), a rotor plate at the bottom of the hopper, a gear housing, and a handle operated spring-biased dispensing member at the bottom of the hopper adjacent the rotor plate.

According to one embodiment of the invention there is provided a collapsible wheeled spreader including a wheel-assembly, a two-part frame member, whose lower part is affixed to the wheel assembly and supports a high-volume hopper as well as a collapsible support stand for the assembly. The leg members of the lower part of the frame diverge slightly away from one another in an upward direction and are pivotally connected to an upper frame member whose leg members extend along the respective axes of the legs of the lower frame member, such that the lower and upper frame members when pivoted into an extended position form a trapezoidal loop and, when returned to their collapsed state, form a generally rectangular prism shape that includes the entire spreader device within the prism's volume, namely, the legs of the lower and upper frames, the handle portion of the upper frame, the axle and wheel assembly of the lower frame, the hopper, the support stand, the seed or material-dispensing mechanism, and a rotor assembly, if such is used in the broadcast type of spreader.

The invention will be better understood as well as further features and advantages thereof become more apparent from the ensuing detailed description taken in conjunction with the drawings.

BRIEF DESCRIPTION OF THE DRAWINGS

FIG. 1 is a schematic perspective view of the portable spreader according to the invention;

FIG. 2 is a schematic side elevational view of the spreader in its collapsed state;

FIG. 3 is close-up perspective schematic view of the details of the support stand for the spreader according to the invention;

FIG. 4 is a schematic schematic perspective view of the dispensing mechanism according to the invention;

FIG. 5 is schematic side elevational view in cross-section the dispensing mechanism shown in FIG. 4 with the flexible shut-off plate shown in the closed position;

FIG. 6 is schematic cross-sectional view of the flexible shut-off plate shown in the fully opened position;

FIG. 7 is a schematic perspective of the rotor plate shown in FIG. 5;

FIG. 8 is schematic perspective of the pivotal connection between a leg member of the lower frame and a leg member of the upper frame, shown in the extended state;

FIG. 9 is schematic perspective of the pivotal connection between a leg member of the lower frame and a leg member of the upper frame, shown in the collapsed state;

FIG. 10 is schematic perspective of the removable screw bolt used with the axle for supporting a removable wheel for the spreader according to the invention;

FIG. 11 is schematic perspective of the snap-together housing for the gearbox used in the spreader according to the invention; and FIG. 12 is schematic plan view of the spreader according to the invention in its collapsed or fold-up state.

DETAILED DESCRIPTION

Referring now to FIG. 1, the broadcast spreader 10, according to the invention, is shown in its extended for-use position and includes a hopper 12 which is generally a rectangular pyramidal structure having a high-volume capacity (over four gallons) that is secured to the tubular leg members 14, 16 of the lower frame 18 (see FIG. 2) by means of thumbnut-bolts combinations 20, which are more particularly described in the U.S. Pat. No. 5,064,325 to McRoskey having the same assignee as the present invention and which patent disclosure is incorporated herein by reference. As disclosed in the McRoskey patent, the thumbnuts have a serrated face for cooperating with a rounded or tubular surface, such as the tubular leg members in the present invention, that provides a number of locking positions, depending upon the degree of torque applied. Also connected to the legs of the lower frame 18 is a collapsible support stand 22 consisting of a pair of U-shaped frames 24 which are pivotally connected by loose clamps 26. Each of the U-shaped leg members have prongs 28 which can be spring-biased into holes 30 provided in the respective leg members 14, 16, as shown in FIG. 2. The spring tension in U-shaped leg members retains the prongs 28 in their respective holes. When all the prongs are inserted into their separate holes 30, the support stand is in its extended position, as shown in FIG. 1. The lower frame also comprises an axle member 32 which supports a pair of wheels 34 at its respective ends in a manner which will be described below. A gearbox housing 36 is also situated on the axle, which housing contains a conventional arrangement of beveled gears (not shown) driven by the axle when it is rotated as a result of moving the spreader over the ground. The gears in turn rotate a spindle 38 (see FIG. 4) which is connected to a rotor plate 40 for rotating same, the details of which will be discussed below. Also connected to the lower frame 18 is an upper frame 42 consisting of leg members 44, 46 and a handle member 48. Connected to the handle is a flexible control member in the form of a conventional cable 52 manually shiftable by a handle member 54 in a well know manner. The cable 52 connects with and operates the dispensing mechanism to be discussed below.

Thumbnut-bolt connectors 50 (such as previously described) cooperate with a bolt 56 to pivotally connect the leg members from the lower frame with the leg members of the upper frame, as shown in FIG. 1 and FIG. 8. The bolt 56 is press-fitted into an aperture in the end portion of the leg members 14, 16 and pass through aligned apertures in end portions of the leg members 44, 46 of the upper frame. When so extended the upper frame and lower frame form a trapezoidal loop, such that the opposing leg members diverge from one another to the degree that the handle portion 48 is of a length that includes the length of the parallel axle member of the lower frame as well as the additional dimension of the wheel assemblies, as best shown in FIG. 12.

As shown in detail in FIG. 8, the respective end portions of the leg members in the upper and lower frames are shaped to allow for a contiguous fit therebetween; that is, the end portion 58 of the leg members in the upper frame is curvilinear, that is, stamped to form a curved plane, in order to conform with the circular shape of the tubular end portions of the leg members of the lower frame. In the extended state, too, the leg members 44, 46 of the upper frame are in a state of tension, owing to their divergent geometry and their connection with the leg members of the lower frame. If the thumbnuts are loosened, this spring tension causes the leg members 44, 46 to spread apart, that is, spring away from the tubular end portions of the lower leg members 14, 16; the upper frame, then, is free to rotate into or assume without resistance the collapsed state, that is, to move in the direction of the arrow shown in FIG. 8, with respect to the lower frame.

When the spreader, according to the invention, is in its collapsed state, as shown in FIG. 3 and FIG. 12, the leg members 44, 46 of the upper frame 42 overlap the leg members 14, 16, but will lie in a different plane from the plane of the leg members of the lower frame. Because of the angular relationship of these two planes, as best seen in FIG. 3, it should be noted that that the curvilinear surface 58 of the end portions of the leg members in the upper frame will not conform with the circular shape of the tubular end portions of the leg members in the lower frame, such as shown in FIG. 9. In this way the leg members of the upper frame remain in their flexed disposition, that is flexed outwardly and will again offer minimal resistance in being swung to their end-of-swing position, as shown in FIG. 8. The upper frame 42 in effect defines a generally rectangular plane at right angles to the plane of the paper in FIG. 3 and in the plane of the paper in FIG. 12. The projection of this rectangular plane defined by the upper frame 46 in a given direction defines a generally rectangular prism that embraces all the working parts of the spreader, that is the wheels, the gearbox housing, the rotor plate, if such is used in a broadcast type of spreader, the dispensing mechanism (to be described below), the hopper and the flexible control member, as shown in FIGS. 3 and 12. It should be noted, too, that this rectangular prism shape is suitable for the spreader to be stored in a similarly shaped rectangular box, which could be the box in which the spreader was purchased. In this way the spreader, according to the invention, can be easily stored or transported and in a confined space if necessary.

The dispensing mechanism for the hopper 12 is shown in FIGS. 4–6. On the bottom of the hopper is an opening 60 through which the contents in the hopper passes in route to the rotor plate that disperses or broadcasts the contents, seed, for example, in a known manner. Of course, in a drop spreader, which is a type of spreader that is also embraced by the principles of this invention, the rotor assembly is dispensed with, since seed or fertilizer and the like is dropped directly from the hopper to the ground. Bordering the opening 60 is a guideway structure 62 comprising two parallel tracks 64, 66 extending along the bottom of the hopper and part way up one side thereof and thereby extending in two directions which are approximately 120 degrees apart, as best shown in FIGS. 5 and 6 Disposed between the tracks 64, 66 is a flexible shut-off plate member 68 which is retained therein by flanges 70, 72. The plate 68 is made flexible by virtue of the plastic hinged sections 70 which are significantly reduced in their thickness dimension with respect to the normal thickness of the plate members. The control cable 52 is connected to one end of the flexible plate, as shown, and the other end of the flexible plate 68 is connected to a pair of rail member extensions 74, 76 which is bridged by a plate extension member 78 having a pair of snap tab members 80 which together with the recess 82 secure a spring bow-like member 84 formed from a spring plastic material, such as ACETAL. The extremities of the spring bow member 84 abut in sliding engagement a pair of runner members 86 extending at right angles to and in opposing directions from the guideway 62. In operation, then, when the control cable 52 is pulled the flexible plate is caused to ride in the guideway 62 against the bias of the spring bow 78. As the bow is pulled by the flexible plate 62, the extremities thereof slide along the runner members 86, as shown by the arrows, and the edge of the flexible plate 62 is pulled past the opening 60 from a completely covered position, as shown in FIGS. 4 and 5, to a completely opened position as shown in FIG. 6. The flexible plate 68, of course, changes direction as the the contour of the guideway 62 changes.

Turning now to FIGS. 5 and 7, the rotor plate 40 for use in the broadcast type of spreader will be seen as a disc rigidly connected to a hexagonal portion of the tubular shaft 88 that at one end is journaled for rotation in a bearing support 90 provided on the bottom of the hopper 12 and disposed adjacent the opening 60 therein. The other end of the shaft 88 is connected to suitable gearing, not shown, and contained in the gearbox housing 36. As understood by the skilled artisan, the gearing is operatively connected to the axle 32 and rotates therewith to rotate the rotor plate and thereby impart a centrifugal force to the seed passing from the opening 60. The rotor plate itself is designed to have a central cone portion 92 that serves to accelerate the seed falling onto it, the opening 60 being disposed directly above the accelerator cone, as best shown in FIG. 5. When the seed hits the cone 92 it is thrown outwardly, that is, broadcast. The blade members 94, dividing the cone and the disc into sectors, assist in flinging the seed in that outward, centrifugal direction.

FIG. 10 shows a removable press-fit screw-threaded retainer pin 98 for securing the wheels 34 to the axle 32 which is shown to be tubular and therefore having a hollow threadless bore 100 for receiving the threaded portion 102 of the screw. The threaded portion is composed of a flexible plastic material, so that the same can be press-fitted into the bore and can be removed—in order to replace or repair a wheel—by merely turning the screw in the conventional manner, as by a screwdriver.

FIG. 11 shows the gearbox housing 36 to be composed of two halves 104 and 106 which form a conventional clamshell housing. A top face 108 of section 104 is seen to have a series of apertures 110 spaced along the interface 112 between the top face and the sidewall 114. The apertures are seen to be rectangular in shape and have one side defined by the interface 112. The bottom half-section 106 is composed of a bottom face 116 and a sidewall 118. Spaced along the peripheral edge of the sidewall are a number of tab members 120, corresponding in number to the apertures in the top half-section, and extending inwardly. The bottom half-section is slightly larger than the top half-section, so that the one section fits over the other section until the tabs 120 snap into the recesses or apertures 110 in the top half section and thereby secure two half sections. A half-section channel member 122 in each half section come together to form the channel for the shaft 88 connected to the rotor plate. Suitable apertures 124 are provided respectively in the each half-section to accommodate the axle member 32 of the broadcast spreader.

Finally, in FIG. 12, the collapsed state of the spreader is shown, as previously described. Of significance, and what is important to the invention, is that the collapsed state of the spreader generally defines a rectangular prism shape which can fit into a box having a similar shape, and indeed the box in which the spreader may have been purchased. It will be seen in both FIGS. 3 and 12 that the rectangular prism defined by the leg members of the upper frame 42 and the handle portion 48 surround and include each wheel assembly 34, the gearbox housing 36, the rotor disc assembly 40, the lower leg members of the lower frame 18, the hopper 12, the dispensing mechanism 62, 68, and the flexible control members 52, 54, as best shown in FIG. 12.

It should be understood that except for the upper and lower frames and the axle, the working parts of the spreader above described are molded from plastic materials.

The foregoing relates to preferred exemplary embodiments of the present invention, it being understood that other embodiments and variants thereof are possible within the scope of the invention, the latter being defined by the appended claims.

What is claimed and desired to be secured by Letters Patent of the United States is:

1. A collapsible spreader having all pre-assembled parts, comprising
    a lower frame having a pair of spaced-apart diverging leg members, said leg members supporting a hopper means, a collapsible support stand means and an axle means, said axle means supporting wheel means, and dispensing means disposed on the bottom of said hopper means,
    an upper frame having a pair of spaced-apart diverging leg members, a handle means, and a flexible control means having one end connected to said handle means and another end connected to said dispensing means,
    pivotal means connecting said leg members of said lower frame with said leg members of said upper frame for allowing said upper frame to assume an end-of-swing extended state and a collapsed state with respect to said lower frame,
    adjustable fastener means on said pivotal means, said leg members of said upper frame being in a state of tension when said fastener means is adjusted to a tightened position, said tension in said leg members of said upper frame assisting said upper frame to assume said collapsed state when said fastener means is adjusted to a loosened position, and
    said collapsed state of said upper frame defining a a generally rectangular prism that includes said leg members of said lower frame, said collapsible support stand means, said hopper means, said wheel means, said dispensing means and said flexible control means.

2. A collapsible spreader according to claim 1, wherein said hopper means defines a generally rectangular pyramid, one face of which defines one plane of said generally rectangular prism.

3. A collapsible spreader according to claim 1, wherein said extended state of said lower and upper frames define a a single plane in which said leg members form a trapezoidal loop.

4. A collapsible spreader according to claim 1, wherein said pivotal means include a stationary bolt means press-fitted into said respective leg members of said lower frame and extending through aligned apertures in said leg members of said upper frame.

5. A collapsible spreader according to claim 1, wherein said lower and upper frames include respective curvilinear end portions for said leg members of said upper frame and respective cylindrical end portions for said leg members of said lower frame, said curvilinear end portions and said cylindrical end portions being complementary and effecting a contiguous fit therebetween when said upper frame is in said extended state and said fastener means is adjusted to said tightened position.

6. A collapsible spreader according to claim 1, wherein said wheel means are affixed to the respective ends of said axle means by removable screw-thread means, said screw-thread means cooperating with a threadless bore in said axle means, whereby said screw-thread means is press-fitted into said bore and is rotated for removal therefrom.

7. A collapsible spreader according to claim 1, further comprising a gearbox housing means disposed on said axle means and said gearbox housing supporting a broadcast rotor means.

8. A collapsible spreader according to claim 7, wherein said gearbox housing comprises a clamshell, two-part housing, one half of which comprise tab members for snap-fit engagement with recesses in the other half of said clamshell housing.

9. A collapsible spreader according to claim 7, wherein said broadcast rotor means comprises a flat disc, the central portion of which defines a cone means for accelerating the centrifugal throw of seed issuing from said dispensing means, and blade means circumferentially spaced on said disc and extending from said perimeter of said disc radially inwardly to center of said disc, thereby dividing said cone means into arcuate sections.

10. A collapsible spreader according to claim 1, wherein said collapsible support stand means comprises a triangular structure whose base is formed by said leg members of said lower frame when in its extended state and further comprises a single-plane structure that is generally parallel to the plane defined by said leg members of said upper frame when its collapsed state.

11. A collapsible spreader according to claim 1, wherein said dispensing means comprises an opening in the bottom of said hopper means, a guideway means bordering said opening and extending part way up one side of said hopper means, a flexible shut-off plate disposed in said guideway means for moving over said opening, said shut-off plate being connected to a bow-like spring member whose extremities are in sliding engagement with a stationary runner means on the bottom of said hopper means, said flexible control means being connected to said flexible shut-off plate, whereby said flexible control means pulls said shut-off plate against the bias of said bow-like spring member to positions ranging from completely covering said opening through partially covering said opening to completely exposing said opening.

12. A collapsible spreader according to claim 11, wherein said flexible shut-off plate comprises multiple plate members hingedly connected to one another.

13. A collapsible spreader according to claim 11, Wherein a stationary stop means is disposed on the bottom of said hopper means adjacent said guideway means for limiting the movement of said bow-like spring member and hence said flexible shut-off plate in the shut-off direction thereof.

14. A spreader comprising,
a frame having a wheel means,
a hopper means defining a generally rectangular pyramid supported by said frame means,
a dispensing means disposed on a bottom face of said hopper means, said dispensing means including an opening in said bottom face of said hopper means,
a guideway means bordering said opening and extending along said bottom face of said hopper means and part way up one side of said hopper means, said guideway means thereby extending in at least two angularly related directions, and
a flexible articulated shut-off plate having flexibly connected multiple plate members disposed in said guideway for moving in said at least two angularly related directions over said opening and up said one side of said hopper means.

15. A spreader according to claim 14, wherein said shut-off plate is connected to a bow-like spring member whose extremities are in sliding engagement with a stationary runner means on said bottom of said hopper means, whereby said shut-off plate can move against the bias of said bow-like spring member to positions ranging from completely covering said opening through partially covering said opening to completely exposing said opening.

16. A spreader according to claim 15, wherein there is further provided a stop means on the bottom of said hopper means adjacent said guideway means for limiting the movement of said bow-like spring member and hence said flexible shut-off plate in the shut-off direction thereof.

17. A spreader according to claim 14, wherein said frame means comprises
a lower frame having a pair of spaced-apart diverging leg members, said leg members supporting said hopper means, a collapsible support stand means and an axle means, said axle means supporting said wheel means,
an upper frame having a pair of spaced-apart diverging leg members and a handle means,
a flexible control means mounted on said handle means and being connected to said dispensing means,
pivotal means connecting said leg members of said lower frame with said leg members of said upper frame, and
fastener means defining an end-of-swing position for an extended state and for a collapsed state of said lower and and upper frames, said leg members of said upper frame when in said collapsed state defining a generally rectangular prism that includes said leg members of said upper frame, said collapsible support stand means, said hopper means, said wheel means, said dispensing means and said flexible control means.

18. A spreader comprising,
a frame means having a wheel means,
a hopper means supported by said frame means, a dispensing means disposed on the bottom of said hopper means, said dispensing means including an opening in the bottom of said hopper means, a guideway means bordering said opening and extending along the bottom of said hopper means, a shut-off plate disposed in said guideway means for moving over said opening, and said shut-off plate is connected to a bow-like spring member whose extremities are in sliding engagement with a stationary runner means on said bottom of said hopper means, whereby said shut-off plate can move against the bias of said bow-like spring member to positions ranging from completely covering said opening through partially covering said opening to completely exposing said opening.

19. A collapsible spreader having all pre-assembled parts, comprising a lower frame having a pair of spaced-apart diverging leg members, said leg members supporting a hopper means and an axle means, said axle means supporting wheel means and a broadcast rotor means, an upper frame having a pair of spaced-apart diverging leg members and a handle means, pivotal means connecting said leg members of said lower frame with said leg members of said upper frame for allowing said upper frame to assume an end-of-swing extended state and a collapsed state with respect to said lower frame, adjustable fastener means on said pi means, said leg members of said upper frame being in a state of tension when said fastener means is adjusted to a tightened position, said tension in said leg members of said upper frame assisting said upper frame to assume said collapsed state when said fastener means is adjusted to a loosened position, and said collapsed state of said upper frame defining a a generally rectangular prism that includes said leg members of said lower frame, said hopper means, said wheel means, and said broadcast rotor means.

* * * * *

UNITED STATES PATENT AND TRADEMARK OFFICE
CERTIFICATE OF CORRECTION

PATENT NO. : 5,288,017
DATED : Feb. 22, 1994
INVENTOR(S) : Paul M. Halovitz

It is certified that error appears in the above-identified patent and that said Letters Patent is hereby corrected as shown below:

Col. 10, line 10, change "pi" to -- pivotal --

Signed and Sealed this

Twenty-seventh Day of September, 1994

Attest:

BRUCE LEHMAN

Attesting Officer

Commissioner of Patents and Trademarks